United States Patent
LaMontagne et al.

(10) Patent No.: US 11,043,022 B2
(45) Date of Patent: Jun. 22, 2021

(54) VIEWABILITY METRICS OF A MULTIDIMENSIONAL OBJECT IN A MULTIDIMENSIONAL DIGITAL ENVIRONMENT

(71) Applicant: Trivver, Inc., Huntington Beach, CA (US)

(72) Inventors: Joel LaMontagne, Huntington Beach, CA (US); Sergey Kondratov, Krasnoyarsk (RU); Igor Bitny, Newport Beach, CA (US)

(73) Assignee: Trivver, Inc., Huntington Beach, CA (US)

( * ) Notice: Subject to any disclaimer, the term of this patent is extended or adjusted under 35 U.S.C. 154(b) by 0 days.

(21) Appl. No.: 16/262,879

(22) Filed: Jan. 30, 2019

(65) Prior Publication Data

US 2020/0242831 A1 Jul. 30, 2020

(51) Int. Cl.
*G06T 15/20* (2011.01)
*G06T 7/62* (2017.01)
*G06T 7/90* (2017.01)

(52) U.S. Cl.
CPC ............... *G06T 15/20* (2013.01); *G06T 7/62* (2017.01); *G06T 7/90* (2017.01); *G06T 2207/30242* (2013.01)

(58) Field of Classification Search
None
See application file for complete search history.

(56) References Cited

U.S. PATENT DOCUMENTS

| | | |
|---|---|---|
| 2001/0035868 A1* | 11/2001 | Uehara ............... G06T 3/00 345/619 |
| 2006/0287105 A1 | 12/2006 | Willis |
| 2007/0072676 A1 | 3/2007 | Baluja |
| 2007/0078706 A1 | 4/2007 | Datta et al. |
| 2009/0138813 A1 | 5/2009 | LaMontagne |
| 2010/0030640 A1 | 2/2010 | van Datta et al. |
| 2010/0177234 A1* | 7/2010 | Ogura ............... G06T 7/11 348/333.03 |

(Continued)

OTHER PUBLICATIONS

Vire AR/VR tracking [available at http://vire.co/tracking], publication date unknown.

(Continued)

*Primary Examiner* — Edward Martello
(74) *Attorney, Agent, or Firm* — Chhabra Law Firm, PC

(57) ABSTRACT

Using various embodiments, methods and systems to determine viewability metrics of a multidimensional object in a multidimensional digital environment are described. In one embodiment, a system is configured to render a viewport of the multidimensional digital environment displayed on the graphical user interface. The viewport includes the object of interest. The object of interest includes a multidimensional digital object. The object of interest is rendered with a first set of colors. The system is further configured to determine a first number of pixels representing a total number of pixels in the first set of colors and to determine a second number of pixels in the viewport representing a total number of pixels of the viewport. Thereafter, a ratio is calculated by dividing the first number of pixels by the second number of pixels. The metric of viewability is then derived by the calculated ratio.

18 Claims, 9 Drawing Sheets

(56) References Cited

U.S. PATENT DOCUMENTS

| | | | |
|---|---|---|---|
| 2010/0217666 A1* | 8/2010 | Belenguer | G06Q 30/02 705/14.45 |
| 2014/0114742 A1 | 4/2014 | Lamontagne et al. | |
| 2018/0018696 A1 | 1/2018 | Lamontagne et al. | |
| 2018/0018828 A1 | 1/2018 | Lamontagne et al. | |

OTHER PUBLICATIONS

Anonymous: "How to calculate screen area coverage of a 3D object", Unity Community, 21 Apr. 1, 2014 (Apr. 21, 2014), pp. 1-2, XP055705084, Retrieved from the Internet:URL:https://answers.unity.com/questions/691066/how-to-calculate-screen-area-coverage-of-a-3d-obje.html.

Anonymous: "ANSYS FLUENT 12.0 User's Guide—30.5 Projected Surface Area Calculations" Jan. 29, 2009 (Jan. 29, 2009). XP055705653. Retrieved from the Internet: URL:https://www.afs.enea.it/project/neptunius/docs/fluent/html/ug/node963.htm#sec-project-surf.

James D. Foley et al: "Computer Graphics Principles and Practice" In: "Computer Graphics Principles and Practice". Jan. 1, 1987 (Jan. 1, 1987). Addison-Wesley. Reading. MA. USA. XP055731305. pp. 668-673. section 15.4.

Naga K Govindaraju et al: "Fast computation of database operations using graphics processors". Jul. 31, 2005; 1077952576-1077952576. Jul. 31, 2005 (Jul. 31, 2005). pp. 206-es. XP058318221. 001: 10.1145/1198555.1198787 sections 3.1. 3.24.1. 4.3.1.

Anonymous: "Style buildings—ArcGIS Online Help: ArcGIS" Oct. 7, 2017 (Oct. 7, 2017). XP055729753. Retrieved from the Internet: URL:https://web.archive.org/web/20171007003301/https://doc.arcgis.com/en/arcgis-online/create-maps/scene-style-buildings.htm.

Inigo Quilez: "Sphere projection" .Inigo Quilez: fractals. computer graphics , mathematics. shaders. demoscene and more. Jan. 1, 2014 (Jan. 1, 2014). XP055729674. Retrieved from the Internet: URL:https://iquilezles.org/www/articles/sphereproj/sphereproj.htm.

Mike Hergaarden: "Graphics shaders", Jan. 1, 2011 (Jan. 1, 2011), XP055731357, Retrieved from the Internet: URL:https://www.cs.vu.nl/-eliens/download/literatuur-shaders.pdf.

Marroquim R et al: "Introduction to GPU Programming with GLSL", Computer Graphics and Image Processing (SIBGRAPI Tutorials), 2009 Tutorials of the XXII Brazilian Symposium on, IEEE, Piscataway, NJ, USA, Oct. 11, 2009 (Oct. 11, 2009), pp. 3-16, XP031616868, ISBN : 978-1-4244-4979-8 abstract p. 9, left-hand column, paragraph 2-6 figure 19.

Shawn Hargreaves: "Combining shaders", Aug. 17, 2009 (Aug. 17, 2009), XP055729750, Retrieved from the Internet: URL:http://www.shawnhargreaves.com/blog/combining - shaders.html.

Dieter Schmalstieg et al: "Real-time Bounding Box Area Computation", Jun. 1, 1999 (Jun. 1, 1999), XP055729701, Retrieved from the Internet: URL:https://www.cg.tuwien.ac.at/research/publications/1999/Fuhr-1999-Conc/TR-186-2-99-05Paper.pdf.

Watt A: "3D Computer Graphics, passage", 3D Computer Graphics, XX, XX, Jan. 1, 2000 (Jan. 1, 2000), pp. 123-135, 142, XP002352223, p. 147, paragraph 1.

Anonymous: "8 .4—Viewports—LearnWebGL", Mar. 8, 2016 (Mar. 8, 2016), XP055729723, Retrieved from the Internet: URL:http://learnwebgl.brown37.net/08 projections/projections viewport.html.

* cited by examiner

```
┌─────────────────────────────────────────────────────────────┐
│ Render, by a computing system, a viewport of the multidimensional │
│ environment displayed on the graphical user interface, wherein the viewport │
│ includes the object of interest, and wherein the object of interest includes a │
│ multidimensional digital object, and wherein the object of interest is rendered │
│                      with a first set of colors                  │
│                                                                  │
│                              502                                 │
└─────────────────────────────────────────────────────────────┘
                               │
                               ▼
┌─────────────────────────────────────────────────────────────┐
│ Determine a first number of pixels, the first number of pixels representing a │
│         total number of pixels in the first set of colors        │
│                                                                  │
│                              504                                 │
└─────────────────────────────────────────────────────────────┘
                               │
                               ▼
┌─────────────────────────────────────────────────────────────┐
│ Determine a second number of pixels in the viewport, the second number │
│         representing a total number of pixels of the viewport    │
│                                                                  │
│                              506                                 │
└─────────────────────────────────────────────────────────────┘
                               │
                               ▼
┌─────────────────────────────────────────────────────────────┐
│  Calculate a first ratio by at least dividing the first number by the second │
│                             number.                              │
│                                                                  │
│                              508                                 │
└─────────────────────────────────────────────────────────────┘
                               │
                               ▼
┌─────────────────────────────────────────────────────────────┐
│ Determine a first metric of viewability of the object of interest using the first │
│                              ratio                               │
│                                                                  │
│                              510                                 │
└─────────────────────────────────────────────────────────────┘
                               │
                               ▼
                              (A)

Determine a geometrical area projection (GAP) of the object of interest on the viewport

602

A (optional)

Calculate a second ratio by dividing the first visibility ratio by the GAP.

604

Determine a second metric of viewability of the object of interest using the second ratio.

606

---

Project vertices of the object of interest from world coordinates to a normalized two dimensional (2D) coordinate system

702

Calculate a total area projected by the vertices of the object of interest in the normalized 2D coordinate system visible on the viewport

704

Derive the GAP of the object of interest on the viewport

Calculate an area of each face projected by the vertices of the first set of colors in the normalized 2D coordinate system visible on the viewport

802

Perform a summation of the area of each face projected by the vertices of the first set of colors in the normalized 2D coordinate system visible on the viewport

804

Determine the total area projected by the vertices of the first set of colors.

Calculate an angle between a first vector which is perpendicular to the each face and a second vector drawn from camera to a point on the each face

902

Determine the each face is visible on the viewport when the angle between the first and second vectors is less than 90 degrees, otherwise determining the each face is not visible on the viewport

904

Calculate the area of each face projected by the vertices of the first set of colors in the normalized 2D coordinate system visible on the viewport.

VIEWABILITY METRICS OF A MULTIDIMENSIONAL OBJECT IN A MULTIDIMENSIONAL DIGITAL ENVIRONMENT

FIELD OF THE INVENTION

Embodiments of the present invention relates generally to data collection for the purposes of analytics in computer generated (or simulated) multidimensional digital environments. More particularly, embodiments of the invention relate to determine metrics of viewability of a multidimensional digital object within a multidimensional digital environment.

BACKGROUND OF THE INVENTION

Multi-dimensional computer generated or simulated environments are utilized in many different fields that use computer aided visualization techniques. Examples can include the industries related to gaming, medical, training, financial, advertising, real-estate, or any field that involves using virtual reality, augmented reality, mixed reality, three dimensional digital objects. An important aspect of any of the above identified fields can include collection of data based on visibility of a multidimensional digital object residing within the multidimensional digital environment. However, currently known embodiments are inefficient or inaccurately collect such data and subsequently can result in inaccurate analytics determination. Therefore, what is needed are systems, methods, and techniques that can overcome the above identified limitations and accurately collect data related to visibility of the multidimensional digital object within the multidimensional digital environment.

SUMMARY OF THE DESCRIPTION

A system of one or more computers can be configured to perform particular operations or actions by virtue of having software, firmware, hardware, or a combination thereof installed on the system that in operation causes or cause the system to perform the actions described herein. One or more computer programs can be configured to perform particular operations or actions by virtue of including instructions that, when executed by data processing apparatus, cause the apparatus to perform the actions described herein.

In one embodiment, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system to determine a metric of viewability of an object of interest (virtual/digital asset) in an electronically generated multidimensional digital environment displayed on graphical user interface by rendering a viewport of the multidimensional digital environment displayed on the graphical user interface, where the viewport includes the object of interest, and where the object of interest includes a multidimensional digital object, and where the object of interest is rendered with a first set of colors. Thereafter the system can be configured to determine a first number of pixels, the first number of pixels representing a total number of pixels in the first set of colors. The system can also determine a second number of pixels in the viewport, the second number representing a total number of pixels of the viewport, and calculate a first ratio by dividing the first number of pixels by the second number of pixels.

Other embodiments of this aspect include corresponding computer systems, apparatus, and computer programs recorded on one or more computer storage devices, each configured to perform the actions of the methods.

Embodiments can include one or more of the following features. The system can include determining a geometrical area of projection (GAP) of the object of interest on the viewport, where the GAP includes the total area projected by the object of interest in a normalized viewport space, and calculating a second ratio by dividing the first ratio by the GAP. The system can further be configured to determine the GAP of the object of interest on the viewport by projecting vertices of the object of interest from world coordinates to the normalized viewport space. The system can also be configured to calculate a total area projected by the vertices of the object of interest in the normalized viewport space. In one embodiment, the normalized viewport space is represented by a normalized two dimensional (2D) coordinate system.

The system can be further configured to determine the total area projected by the vertices of the first set of colors the processing system by calculating an area of each face of the object of interest projected by the vertices of the first set of colors in the normalized viewport space and performing a summation of the area of each face projected by the vertices of the first set of colors in the normalized viewport space. The system can be configured to determine objects that are not an object of interest, within the viewport, by rendering such objects with a second set of colors. An object of interest can include a multidimensional bounding box enclosing the multidimensional digital object/asset. The multidimensional bounding box can be of the same number of dimensions as that of the asset it bounds. In one embodiment, the multidimensional digital environment can be at least a three-dimensional environment. In one embodiment, the multidimensional digital object can be at least a three-dimensional digital object. In yet another embodiment, the bounding box is at least three-dimensional and encloses a three dimensional object. Implementations of the described techniques may include hardware, a method or process, or computer software on a computer-accessible medium.

BRIEF DESCRIPTION OF THE DRAWINGS

The present invention is illustrated by way of example and not limitation in the figures of the accompanying drawings in which like references indicate similar elements.

FIG. 5 illustrates flow diagram 500 describing the operations to determine a metric of viewability of an object of interest in a multidimensional digital environment, according to one embodiment of the invention.

FIG. 6 illustrates flow diagram 600 describing the operations to determine another metric of viewability of an object of interest in a multidimensional digital environment, according to one embodiment of the invention.

FIG. 7 illustrates flow diagram 700 describing the operations to derive the Geometrical Area of Projection of an object of interest in a multidimensional digital environment, according to one embodiment of the invention.

FIG. 8 illustrates flow diagram 800 to determine a total area of all faces projected by the vertices of an object of interest in a normalized two dimensional coordinate system of a viewport, according to one embodiment of the invention.

FIG. 9 illustrates flow diagram 900 to determine an area of each face projected by the vertices of an object of interest, according to one embodiment of the invention.

DETAILED DESCRIPTION

Figure 1:
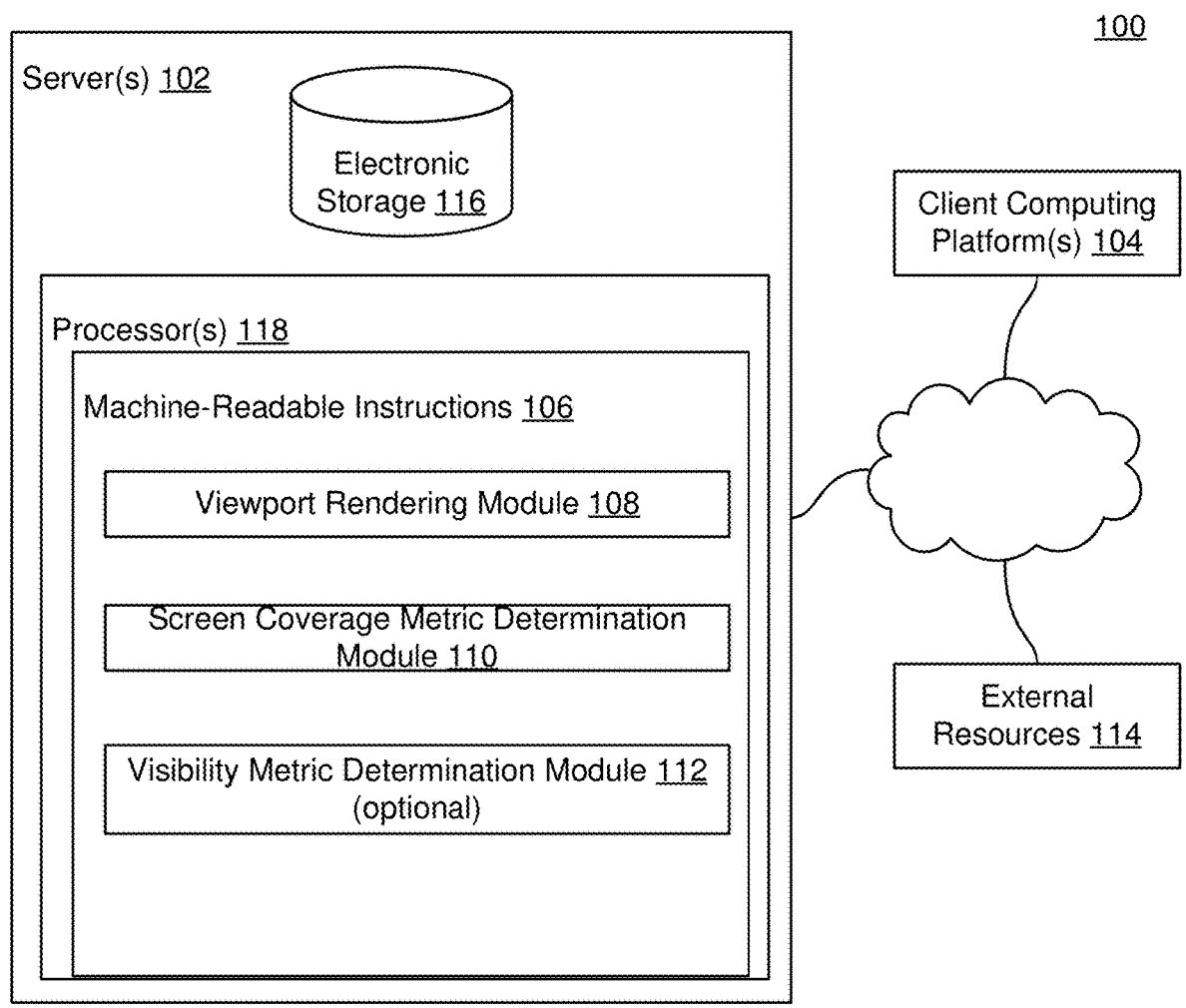
FIG. 1 illustrates system 100 configured to determine a metric of visibility of an object of interest in an electronically generated multidimensional digital environment displayed on graphical user interface, according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

The following terminology is used herein:

A screen coverage metric (also referred to herein as metric of screen coverage) means a measure related to screen coverage of a multidimensional object, on a viewport of a graphical interface (e.g., screen), in a multidimensional digital environment. The metric can be represented as a percentage or ratio. In this regard, screen coverage means a span ratio or percentage of a multidimensional object relative to the viewport displaying the multidimensional digital environment. A viewport is an area (e.g., rectangular or any other geometrical shape) that is expressed in coordinates specific to a rendering device. Therefore, a viewport of a conventional graphical interface displayed on a screen would be the pixels of the screen, and the viewability of an object would be the ratio or percentage an object spans (in pixels) relative to the viewport. Pixel as referred to herein can be a conventional pixel, a Texel (that is, a pixel with a texture element, also referred as texture pixel herein), or any other picture element as known to a person of ordinary skill in the art.

A visibility metric (also referred to herein as metric of visibility) means a measure related to the visibility of a multidimensional object, or a portion thereof, on a viewport of a graphical interface, in a multidimensional digital environment. Visibility metric means a measure of visibility of the multidimensional object on the viewport. The metric can be determined as a percentage or ratio. In this regard, visibility of an object means a ratio or percentage of a multidimensional object that is visible to a user or viewer of the viewport of the multidimensional digital environment.

Metric of viewability (also referred to herein as viewability metric or viewability metrics) can mean a screen coverage metric, a visibility metric, a combination thereof, or any result derived by an association of the screen coverage metric and the visibility metric.

An object of interest is any object whose metric of viewability needs to be determined. In one embodiment, an object of interest can be a multidimensional object displayed within a multidimensional environment. In other embodiments the object of interest can also include a bounding box that encloses the multidimensional object.

A geometrical area of projection (GAP) is the total area projected by an object of interest, in a normalized coordinate system, visible on the viewport (normalized viewport space). This can be determined using the vertices projected by the object of interest. When the rendering device includes a conventional graphical interface (e.g., screen) the normalized coordinate system can be represented as a two dimensional coordinate system.

Although exemplary embodiments are explained in a screen coordinate system, the scope of the invention is not intended to be limited to conventional rendering devices (e.g., screens), but can include multidimensional rendering devices, including interfaces required for virtual and augmented reality systems, mixed reality, and three dimensional digital environments.

FIG. 1 illustrates system 100 configured to determine a metric of visibility of an object of interest in an electronically generated multidimensional digital environment displayed on graphical user interface in accordance with one embodiment. In some embodiments, system 100 can include one or more servers 102. Server(s) 102 can be configured to communicate with one or more client computing platforms 104 according to a client/server architecture and/or other architectures. Client computing platform(s) 104 can be configured to communicate with other client computing platforms via server(s) 102 and/or according to a peer-to-peer architecture and/or other architectures. Users can access system 100 via client computing platform(s) 104.

Server(s) 102 can be configured by machine-readable instructions 106. Machine-readable instructions 106 can include one or more instruction modules. The instruction modules can include computer program modules. The instruction modules can include one or more of a Viewport Rendering Module 108, a Screen Coverage Metric Determination Module 110, and optionally a Visibility Metric Determination Module 112, and/or other instruction modules. Visibility Metric Determination Module 112 can, in one embodiment, also include a GAP determination module (not shown).

Viewport Rendering Module 108 can be configured to render a viewport of the multidimensional digital environment displayed on the graphical user interface. The viewport, in this embodiment can include the object of interest. In one embodiment the object of interest can include a multidimensional digital object. In yet other embodiments, the object of interest can also include a bounding box enclosing the multidimensional digital object. In a preferred embodiment, viewport rendering module 108 can render a scene in a multidimensional digital environment by placing an additional camera at the exact same position as the main scene camera using which the scene is viewable to the user. In another embodiment, both the additional camera and the main scene camera can have a same focal length as well.

In one embodiment, module 108 can render the object of interest with a set of colors. The set of colors can be any color that is preconfigured to represent the object of interest. For example, in one embodiment, any or all objects of interest can be rendered in one or more colors (e.g., black, green, white, etc.) while other objects (not considered as an object of interest) can be rendered in a different color to identify the objects of interest from the rest of the rendered viewport or screen. As referred to herein a color is indented to mean a unique shade of a color, which can usually be represented with a unique hexadecimal (hex) color code and/or red, blue, green (RGB) value.

In one embodiment, using the additional camera a render texture can be applied where each object of interest is rendered with a unique color (e.g. green), while other scene features/objects not of interest are rendered in a particular color (e.g., black), to allow screen coverage metric determination module 110 to identify the number of pixels for object of interest on the viewport, as described further herein. Each pixel of can be categorized by color to determine one or more objects of interest and to determine the number of pixels of the viewport used by each object of interest. In one embodiment, Module 108 renders the viewport to a low-resolution image using the additional camera of the multidimensional digital environment, where the camera is at placed at, or approximately at, a position and rotation as that of the current scene camera using which the scene is viewable to the user in the multidimensional digital environment. In one embodiment, the rendered view of the additional camera may be hidden from the user (that is, the user/viewer is able to only see the scene as rendered by the main camera). In this implementation, the main camera is used to display a scene of a multidimensional digital environment to a user or viewer on the viewport whereas the additional camera is exactly overlapped over the main camera so that both cameras render the exact same scene from the same distance and orientation. In one embodiment, both cameras share the same properties (e.g., focal length, angle of view, etc.). In one embodiment, a screenshot/snapshot of the rendered scene is taken which is then used by screen coverage metric determination module 110 for further processing. In one embodiment, server 102 can be configured to take a screenshot/snapshot at predetermined intervals.

Screen Coverage Metric Determination Module 110 can be configured to determine a total number of pixels representing the objects of interest as well as total number of pixels in the viewport. Thereafter, module 110 can determine the screen coverage metric by dividing the number of pixels used by the object of interest (e.g., based on color) by the total number of pixels in the viewport. This ratio or proportion can represent, or can be used to derive, the metric of screen coverage by the object of interest.

Optional embodiments can includes Visibility Metric Determination Module 112 that can be configured to determine the ratio or percentage of the object of interest on the view port. In one embodiment, module 112 can determine the visibility metric by dividing the screen coverage metric by the GAP. The GAP can be calculated by a GAP determination module that can be optionally be implemented by module 112 or independently by another module.

In one embodiment, the GAP provides an estimate of the hypothetical screen area for the object of interest's projection on the viewport. In one embodiment, the visibility metric can represent the ratio between the actual size (area) of the object of interest that is visible on the screen and its hypothetical maximum. The visibility metric reflects, or takes into consideration, not only parts of the object of interest that are obscured by other objects, but also the part (portion) of the object that is not visible on the viewport. Thus, in one embodiment, a ratio or proportion by module 112, related to visibility of the object of interest can be determined by diving the ratio of screen coverage by the object of interest (as determined by module 110) by the calculated GAP of the object of interest. The ratio or proportion determined by module 112 can represent, or can be used to derived, the visibility metric.

In some embodiments, server(s) 102, client computing platform(s) 104, and/or external resources 114 can be operatively linked via one or more electronic communication links. For example, such electronic communication links can be established, at least in part, via a network such as the Internet and/or other networks. It will be appreciated that this is not intended to be limiting, and that the scope of this disclosure includes embodiments in which server(s) 102, client computing platform(s) 104, and/or external resources 114 can be operatively linked via some other communication media.

A given client computing platform 104 can include one or more processors configured to execute computer program modules. The computer program modules can be configured to enable an expert or user associated with the given client computing platform 104 to interface with system 100 and/or external resources 114, and/or provide other functionality attributed herein to client computing platform(s) 104. By way of non-limiting example, the given client computing platform 104 can include one or more of a desktop computer, a laptop computer, a handheld computer, a tablet computing platform, a NetBook, a Smartphone, a gaming console, and/or other computing platforms. External resources 114 can include sources of information outside of system 100, external entities participating with system 100, and/or other resources. In some embodiments, some or all of the functionality attributed herein to external resources 114 can be provided by resources included in system 100.

Server(s) 102 can include electronic storage 116, one or more processors 118, and/or other components. Server(s) 102 can include communication lines, or ports to enable the exchange of information with a network and/or other computing platforms. Illustration of server(s) 102 in FIG. 1 is not intended to be limiting. Server(s) 102 can include a plurality of hardware, software, and/or firmware components operating together to provide the functionality attributed herein to server(s) 102. For example, server(s) 102 can be implemented by a cloud of computing platforms operating together as server(s) 102.

Electronic storage 116 can comprise non-transitory storage media that electronically stores information. The electronic storage media of electronic storage 116 can include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 116 can include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 can include one or more virtual storage resources (e.g., cloud storage, a virtual private network, and/or other virtual storage resources). Electronic storage 116 can store software algorithms, information determined by processor(s) 118, information received from server(s) 102, information received from client computing platform(s) 104, and/or other information that enables server(s) 102 to function as described herein.

Processor(s) 118 can be configured to provide information processing capabilities in server(s) 102. As such, processor(s) 118 can include one or more of a digital processor, an analog processor, a digital circuit designed to process information, an analog circuit designed to process information, a state machine, and/or other mechanisms for electronically processing information. Although processor(s) 118 is shown in FIG. 1 as a single entity, this is for illustrative purposes only. In some embodiments, processor(s) 118 can include a plurality of processing units. These processing units can be physically located within the same device, or processor(s) 118 can represent processing functionality of a plurality of devices operating in coordination. Processor(s) 118 can be configured to execute modules 108, 110, 112, and/or other modules.

Processor(s) 118 can be configured to execute modules 108, 110, 112, and/or other modules by software; hardware; firmware; some combination of software, hardware, and/or firmware; and/or other mechanisms for configuring processing capabilities on processor(s) 118. As used herein, the term "module" can refer to any component or set of components that perform the functionality attributed to the module. This can include one or more physical processors during execution of processor readable instructions, the processor readable instructions, circuitry, hardware, storage media, or any other components.

It should be appreciated that although modules 108, 110, and/or 112, are illustrated in FIG. 1 as being implemented within a single processing unit, in embodiments in which processor(s) 118 includes multiple processing units, one or more of modules 108, 110, and/or 112 can be implemented remotely from the other modules. The description of the functionality provided by the different modules 108, 110, and/or 112 described below is for illustrative purposes, and is not intended to be limiting, as any of modules 108, 110, and/or 112, can provide more or less functionality than is described. For example, one or more of modules 108, 110, and/or 112 can be eliminated, and some or all of its functionality can be provided by other ones of modules 108, 110, and/or 112. As another example, processor(s) 118 can be configured to execute one or more additional modules that can perform some or all of the functionality attributed below to one of modules 108, 110, and/or 112.

Figure 2:
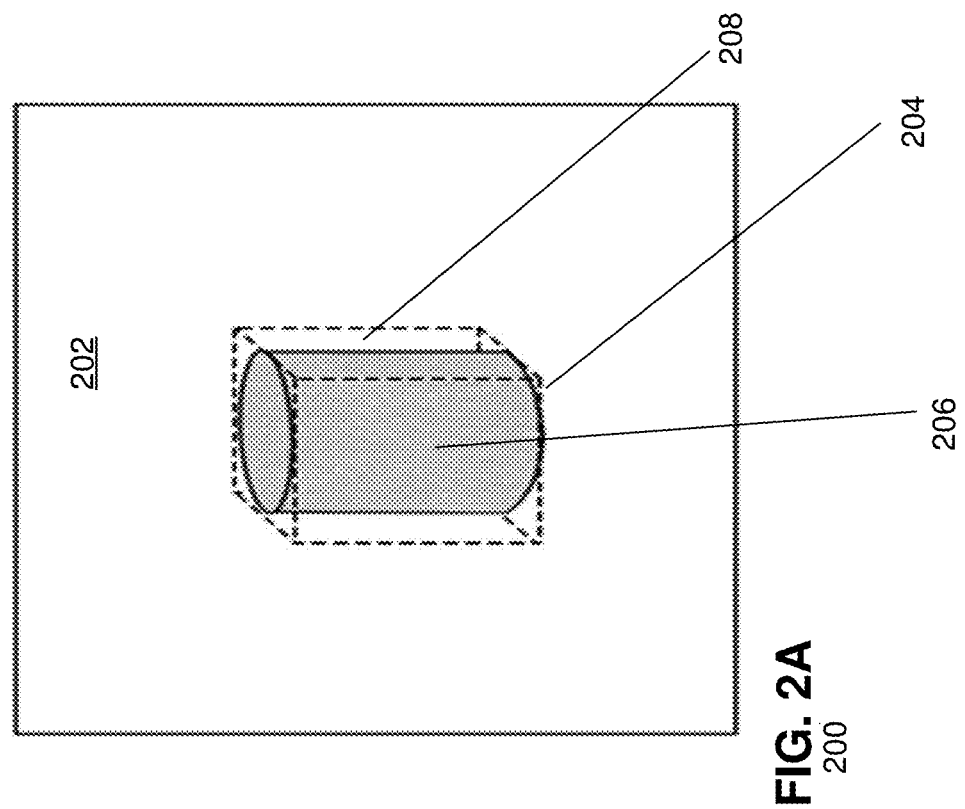
FIG. 2A illustrates diagram 200 describing an object of interest in a viewport of a multidimensional digital environment, according to one embodiment of the invention.
FIG. 2B illustrates diagram 201 describing a rendered object of interest in a viewport of a multidimensional digital environment, according to one embodiment of the invention.

FIG. 2A illustrates scene 200 describing an object of interest in a viewport of a multidimensional digital environment, according to one embodiment of the invention. As illustrated, viewport 202 can display, in one embodiment, an object of interest 204. Object of interest 204 can be a multidimensional digital object displayed in a multidimensional digital environment. Object of interest 204 can include asset 206 which can represent the multidimensional digital object and optionally can also include bounding box 208 that encloses asset 206.

FIG. 2B illustrates scene 201 describing a rendered object of interest in a viewport of a multidimensional digital environment, according to one embodiment of the invention. As illustrated, in this embodiment, object of interest 204 includes asset 206 and bounding box 208. Object of interest 204 can be rendered with a specific color to differentiate it from the remainder of the objects in viewport 202. Viewport 202 and all other objects that are not considered as an object of interest can be rendered in another color that is different from the specific/unique color used to render object of interest 204. The rendering of object of interest 204 can be projected on the viewport of the multidimensional digital environment as 210, as shown.

In one embodiment, viewport 202 is rendered by an additional camera, in a lower resolution than the main camera that is visible to the user/viewer of the scene. In this embodiment, the scene displayed by the additional camera (e.g., scene 201) remains hidden from the user/viewer. In one embodiment, the additional camera can be used to implement the invention as described herein. The additional camera is overlapped on the main camera that is used to render the scene as viewed by the user/viewer.

Figure 3:
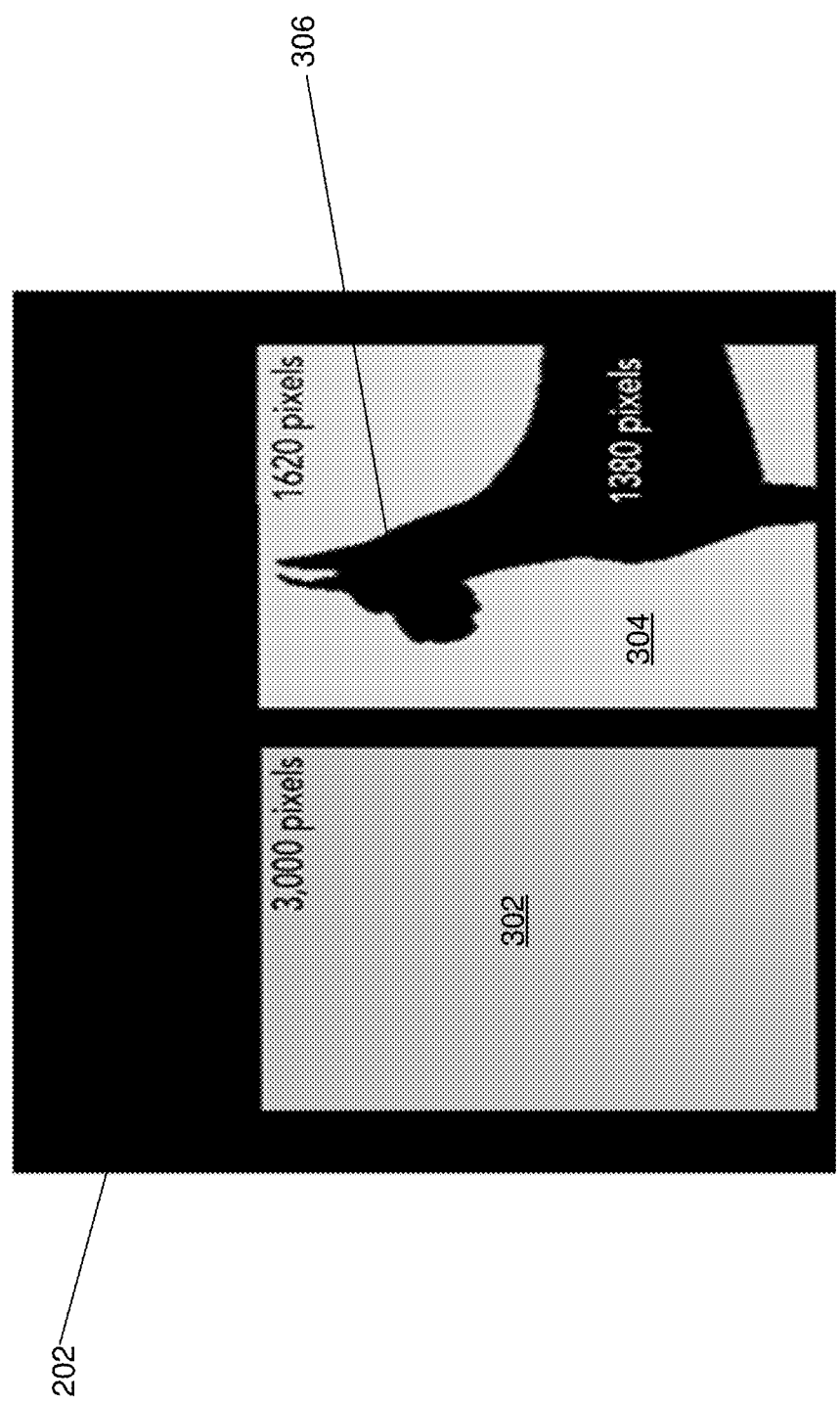
FIG. 3 illustrates diagram 300 describing two objects of interest of the same size with the same orientation and distance and determining a screen coverage ratio of the object of interest relative to the viewport, according to one embodiment of the invention.

FIG. 3 illustrates rendered scene 300 describing two objects of interest, 302 and 304, of the same size displayed in viewport 202. In an exemplary embodiment, scene 300 is a low resolution seen rendered with an additional camera located at the same orientation, position, and distance as the main camera that is used to display the rendered scene of the multidimensional digital environment to the user. As illustrated, the camera has an unobstructed view of object of interest 302, while the camera has a partially obstructed view of object of interest 304. As illustrated, another object 306 (that is not an object of interest) partially obstructs the camera's view of object of interest 304. As an example, it is presumed objects of interest 302 and 304 each render 3,000 pixels (when not obstructed by another object) of viewport 202 while object 306 renders 1,380 pixels. However, since the view of object of interest 304 is partially obstructed by object 306, as illustrated, object of interest 304 renders 3,000−1,380=1,620 pixels of viewport 202. Thus, if it is presumed viewport 202 renders 10,000 pixels in total, screen coverage ratio, $V_1$, of object of interest can be determined as:

$$V_1 = \text{pixels of object of interest} \div \text{total number of pixels in viewport}$$

$$V_{1(object\ 302)} = 3,000 \div 10,000 = 0.300$$

$$V_{1(object\ 304)} = 1,620 \div 10,000 = 0.162$$

Thus, in this example, the metric of screen coverage can be determined as 0.3 or 30% for object of interest 302 and 0.162 or 16.2% for object 304. In one embodiment, a system can be configured to set the metric of screen coverage to be zero if the actual calculated screen coverage ratio is below a predetermined threshold. In one embodiment, if the metric of screen coverage is determined to be below a predetermined threshold, the metric can be presumed to be zero (that is, the object of interest is presumed to be not visible on the viewport) despite being visible at least in part.

Figure 4B:
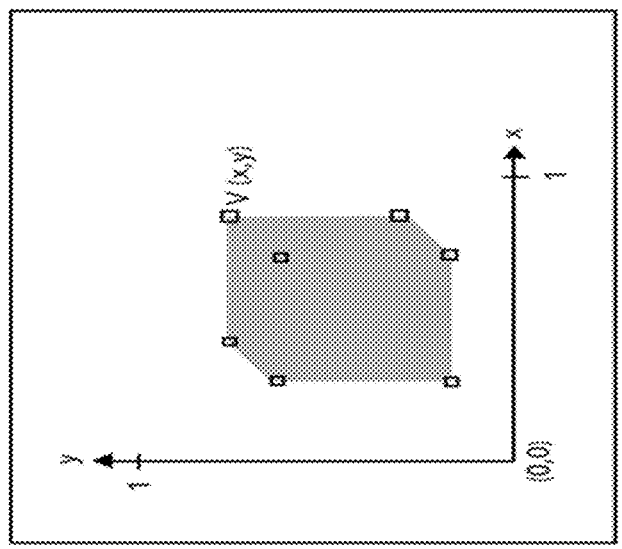
FIG. 4B illustrates diagram 401 illustrating the Geometrical Area of Projection of an object of interest on a normalized coordinate of the viewport of a multidimensional digital environment, according to one embodiment of the invention.
Figure 4A:
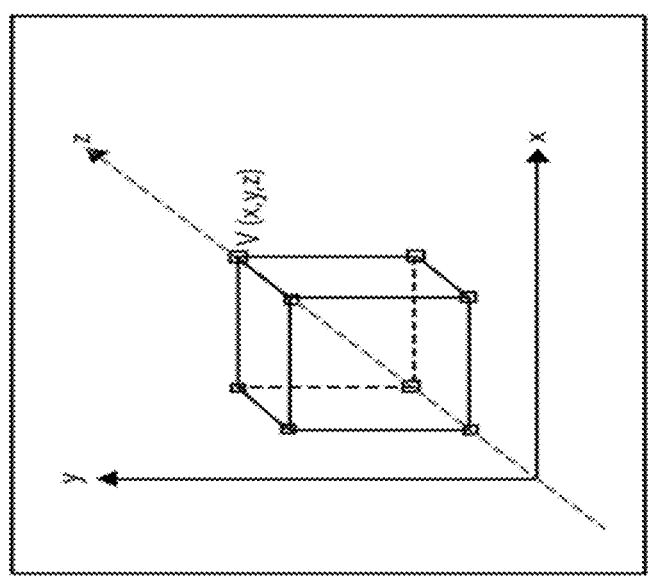
FIG. 4A illustrates diagram 400 describing an object of interest in a multidimensional space whose Geometrical Area of Projection needs to be determined, according to one embodiment of the invention.

FIGS. 4A and 4B illustrate diagrams 400 and 401, respectively, describing an object of interest in a multidimensional space whose Geometrical Area of Projection (GAP) needs to be determined, according to one embodiment of the invention. As illustrated, the GAP is computed by projecting the vertices of the object of interest from world coordinates (e.g., x,y,z coordinates in a three dimensional environment) (FIG. 4A) to a two dimensional coordinate system (FIG. 4B) by calculating the area of each face of the object of interest (if visible). In one embodiment, the GAP is calculated by summing the total area of each of the rendered faces of the object of interest in the viewport. Summing the area for each face is used to calculate the maximum theoretical area for the object of interest at the distance and orientation from the camera (from where the scene is rendered).

In one embodiment, the GAP uses normalized viewport coordinates (NVC) to calculate the area of each face of the object of interest. In one embodiment, NVC refers to a viewport space that is represented by a 2D coordinate system. In the NVC, the coordinates can begin with 0,0 as the minimum value and range to 1,1 as the maximum in a two dimensional coordinate system. Thus, in one embodiment, the GAP of the object of interest on the viewport can be determined by projecting the vertices of the object of interest from world coordinates to a normalized viewport space (e.g., NVC system). Thereafter, a total area projected by the vertices of the object of interest in the viewport space.

In one embodiment, the multidimensional digital environment can be represented as a three dimensional space. In this embodiment, to calculate the GAP, the object of interest can be represented as including a bounding box in the shape of a parallelogram. Once the world coordinates are projected in the NVC system, in a 2D space, the object of interest can be represented as having between one and three convex quadrilaterals.

In one embodiment, before projecting faces of a parallelogram, it is determined which face of the parallelogram are currently visible to the camera. In order to define visible faces, the system, in one embodiment, measures the angle between the face's normal and the vector from the camera to the face. In one embodiment, the camera's position to a face's median point is determined. This point is calculated in the viewport coordinate system (model coordinate system).

In one embodiment, the median point ($M_p$) of the face in a plane (projected on the y axis) can be calculated as:

$$M_p=((x1,y,z1)+(x1,y,z2)+(x2,y,z2)+(x2,y,z1))\div 4$$

In one embodiment, a face to be projected in the viewport coordinate system is considered as visible if the angle between face's normal and vector ($C_p$–$M_p$) is between ±90 degrees (that is, between +90 and −90 degrees), where $C_p$ is the point where the camera is placed within a three dimensional space. Thereafter, points can be projected from the visible faces to the viewport space. In one embodiment, this operation can be performed using a View Projection matrix ($M_{ViewProjection}$). Projection of point P from 3D space ($P_{3Dspace}$) to the viewport space ($P_{viewspace}$) can be expressed as:

$$P_{viewspace}=M_{ViewProjection} \times P_{3Dspace}$$

where $P_{3Dspace}$ is homogeneous coordinates of P=(x, y, z, 1). Projection operation itself can be, in one embodiment, the multiplication of matrix on the vector.

In one embodiment, to derive the View Projection matrix the view Projection matrix as used in the rendering pipeline in 3D Engine is used. The View Projection matrix can be determined by using the position/rotation of the camera, Field of View (FOV), screen aspect ratio, camera's far and/or near clip planes.

After each point of the object of interest in the viewport space is projected, one or more polygons can be defined from the projection. The area of each polygon (e.g., triangle, quadrilateral, square, pentagon, hexagon, octagon, etc.) can then be derived. In one embodiment, the sum of all polygons areas that are projected on the viewport space, related to the object of interest, can be considered as the GAP. The polygons can be identified as quadrilaterals, squares, triangles, hexagons, pentagons, etc.

In one embodiment, the GAP can use normalized viewport space based coordinates, where the area [0, 1] for x and y-axes is the viewport (screen). Points projected beyond that range considered as located off the screen. Thus, in this embodiments, GAP is measured related to the screen size and includes a ratio of the area of the object of interest projected on the screen divided by the total area of the screen. Thus, the GAP in a normalized viewport space can be represented as:

$$GAP=S_{projection} \div S_{screen}, \text{ where } S_{screen}=1$$

In one embodiment, the total area projected by the vertices of the object of interest can be determined after rendering the object of interest into a specific (unique) color as previously described herein. In one embodiment, the total area projected by the vertices can include determining a number of faces of the object of interest (identified based on the rendered color of each pixel of the viewport), where each face is determined using a set of vertices projected in the viewport space (e.g., NVC system). Thereafter, the area of each projected face that is visible on the viewport is determined and a summation of the area of each face projected by the vertices is performed.

In one embodiment, to determine whether the faces that are visible on the viewport, based on the color of pixel identified as the object of interest, an angle between a first vector which is perpendicular to the each face and a second vector drawn from camera to a point on the each face is determined. If the angle between the first and second vectors is less than 90 degrees, it is presumed the face is visible on the viewport, otherwise the face is determined to be not visible. An angle of 90 degrees would imply that only an edge of the object is visible. In one embodiment, the second vector is drawn to the center of each identified face. However, it should be noted, any endpoint on the face can be considered. Therefore, the second vector need not be drawn towards the center of the face.

In one embodiment, a visibility metric ($V_2$) can be calculated, or be partially determined, by dividing the screen coverage ratio ($V_1$) by the GAP. Thus, in one embodiment:

$$V_2=V_1 \div GAP$$

In one embodiment, either $V_1$ or $V_2$ can be derived into a percentage by multiplying each respective ratio by 100. In one embodiment, the GAP includes the total area projected by the object of interest in the NVC system. In one embodiment, $V_2$ can be used to determine or derive the visibility metric. In one embodiment, the viewport can be rendered to a low-resolution image using a camera of the multidimensional digital environment, where the camera is at least one of placed at or approximately placed at a position and rotation/orientation, and has a focal length as that of another camera of the multidimensional digital environment. The other camera used to render the viewport may or may not be visible to a viewer of the multidimensional digital environment. In one embodiment, object of interest includes a bounding box enclosing the multidimensional digital object (asset). In other embodiments, the object of interest may include the bounding box. The methods and techniques described herein can be implemented in an environment having any number of dimensions. Thus, in one embodiment, the multidimensional digital environment is at least a three-dimensional environment, and the multidimensional digital object (asset) is at least a three-dimensional digital object. In yet another embodiment, the asset can be a two dimensional digital object.

In an alternative embodiment, visibility metric ($V_2$) can be determined by using the intersection between the vertices of an object of interest and the frustrum from the camera's field of view. The following calculations can be used to determine the relative percentage of the intersection with the camera's frustrum.

$$\text{Percentage}_{Object\ on\ screen} = \text{Object}_{Vertices\ In\ Frustrum} + \text{Object}_{Total\ Sampled\ Vertices}$$

In one embodiment, a predetermined number of sampled vertices (e.g., 1000 vertices) in the volume of the object of interest are selected. Such selection can be random or at predetermined fix locations. For each of these points/vertices, a computer system can determine whether the point falls within the boundaries of the camera's frustrum. To estimate the ratio of the object that appears in the viewport space, the total number of vertices that fall within the frustrum are divided by the total number of sampled vertices for the object of interest (e.g., 1000). In yet another embodiment, if the total number of available vertices in an object is fewer than the predetermined number of sampled points, all available vertices are sampled.

In one embodiment the object of interest can also include a bounding box enclosing the multidimensional digital object. The multidimensional digital environment described herein can be a computer environment with two, three, four, six, twelve, etc. dimensions (but certainly not limited to the mentioned dimensions). Thus, in one embodiment the computer environment described herein is at least a three dimensional environment, and where the multidimensional digital object is at least a two dimensional digital object. In another embodiment the digital object can be up to the same number of dimensions as the computer environment. Therefore, a three dimensional environment can have a digital object having up to three dimensions, a four dimensional environment can have a digital object having up to four dimensions, etc. In one embodiment, the metric of viewability can be further determined from the first ratio in association with the second ratio. In one embodiment, another object, within the viewport, that is not the object of interest can be rendered with preconfigured color(s) that represent any object not considered as the object of interest. In yet another embodiment, the viewport is rendered to a low-resolution image using a low-resolution camera (LRC) of the multidimensional digital environment, where the LRC is at placed at, or approximately at, a position and rotation as that of the main camera of the multidimensional digital environment; the scene rendered by the main camera being viewable by a user/viewer. In one embodiment, the scene rendered by the LRC is not visible to the user. In yet other embodiments the main camera and the LRC can both can have a same focal length as well.

FIG. 5 illustrates flow diagram 500 describing the operations to determine a metric of viewability of an object of interest in a multidimensional digital environment, according to one embodiment of the invention.

As illustrated, at 502, the operations include rendering a viewport of the multidimensional digital environment displayed on the graphical user interface, where the viewport includes the object of interest. The object of interest can include a multidimensional digital object, and can be rendered by using one or more colors that are preconfigured to be associated with the object of interest. Thereafter, at 504, a total number of pixels projecting the object of interest are determined. This can, in one embodiment, be determined by calculating the total number pixels represented by the one or more preconfigured colors that are associated with the object of interest. At 506, a total number of pixels of the viewport are determined, and at 508, a ratio is calculated by dividing the total number of pixels represented by the object of interest by the total number of pixels in the viewports. The first ratio can then, in one embodiment, represent, or can be used to derive, the metric of screen coverage by the object of interest ($V_1$) as illustrated at 510.

FIG. 6 illustrates flow diagram 600 describing the operations to determine another metric of viewability of an object of interest in a multidimensional digital environment, according to one embodiment of the invention.

As illustrated, at 602, the GAP of the object of interest on the viewport is determined. At 604, optionally, a second ratio by dividing the first ratio by the GAP can be determined. The second ratio can represent, or can be used to derived, the visibility metric ($V_2$), as illustrated at 606.

FIG. 7 illustrates flow diagram 700 describing the operations to derive the GAP of an object of interest in a multidimensional digital environment, according to one embodiment of the invention.

As illustrated, at 702, the GAP of the object of interest on the viewport can be determined by projecting vertices of the object of interest from world coordinates to a normalized viewport space (e.g., two dimensional (2D) coordinate system). At 704, a total area projected by the vertices of the object of interest in the normalized 2D coordinate system visible on the viewport can be calculated. At 706, the GAP is determined based on the total area projected by the vertices.

FIG. 8 illustrates flow diagram 800 to determine a total area of all faces projected by the vertices of an object of interest in a normalized two dimensional coordinate system of a viewport, according to one embodiment of the invention.

As illustrated, at 802, the total area projected by the vertices of each face of the object of interest is determined. In one embodiment, where the object of interest is projected by one or more predefined colors, the vertices are determined by the color(s) of projection in the normalized 2D coordinate system visible on the viewport. Thereafter, a summation of the area of each face projected by the vertices of the color representing the object of interest in the normalized 2D coordinate system visible can be performed to determine the total area projected by the vertices of the first set of colors as illustrated at 804. Thereafter, at 806, the total area projected by the vertices of the object of interest is determined.

FIG. 9 illustrates flow diagram 900 to determine an area of each face projected by the vertices of an object of interest, according to one embodiment of the invention.

As illustrated, at 902, an angle between a first vector that is perpendicular to each face and a second vector drawn from a camera of the multidimensional digital environment to a point on that respective face is calculated. At 904, if it is determined that that a face is visible on the viewport when the angle between the first and second vectors is less than ±90 degrees. If the angle is determined to be ±90 degrees, then it is considered as the edge of the object. Any angle more than ±90 degrees is considered to be not visible on the viewport, as illustrated at 904. At 906, the area of each face projected by the vertices of the color(s) representing the object of interest in the normalized 2D coordinate system that are determined to be visible on the viewport are calculated.

Figure 10:
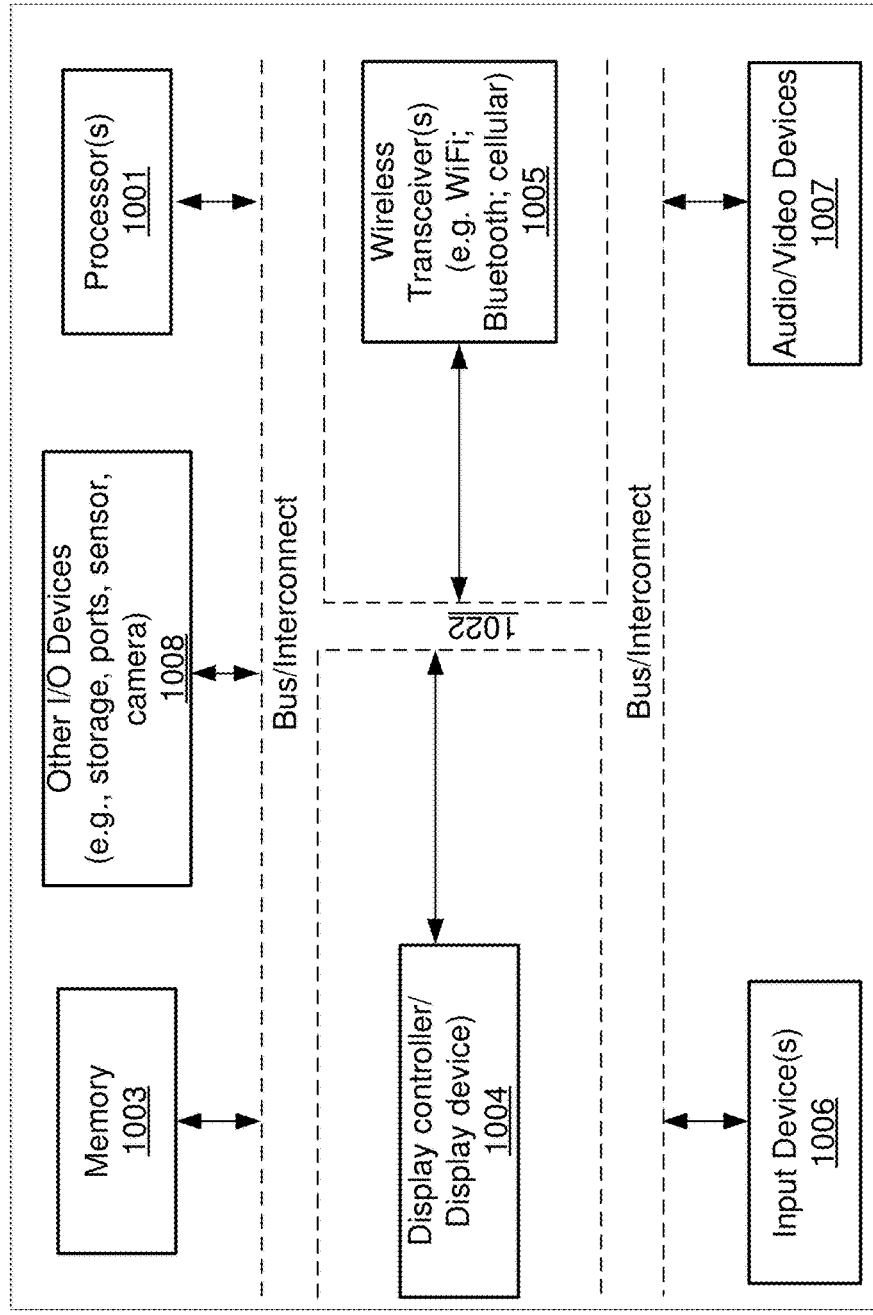
FIG. 10 is a block diagram illustrating a data processing system such as a computing system 1000, according to one embodiment of the invention.

FIG. 10 is a block diagram illustrating a data processing system such as a computing system 1000 which may be used with one embodiment of the invention. For example, system 1000 can be implemented as part of a system to determine viewability metrics of a multidimensional object in a multidimensional digital environment. It should be apparent from this description that aspects of the present invention can be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

In one embodiment, system 1000 can represent the server 102. System 1000 can have a distributed architecture having a plurality of nodes coupled through a network, or all of its components may be integrated into a single unit. Computing system 1000 can represent any of the data processing systems described above performing any of the processes or methods described above. In one embodiment, computer system 1000 can be implemented as integrated circuits (ICs), discrete electronic devices, modules adapted to a circuit board such as a motherboard, an add-in card of the computer system, and/or as components that can be incorporated within a chassis/case of any computing device. System 1000 is intended to show a high level view of many components of any data processing unit or computer system. However, it is to be understood that additional or fewer components may be present in certain embodiments and furthermore, different arrangement of the components shown may occur in other embodiments. System 1000 can represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 1000 includes processor 1001, memory 1003, and devices 1005-1008 via a bus or an interconnect 1022. Processor 1001 can represent a single processor or multiple processors with a single processor core or multiple processor cores included therein. Processor 1001 can represent one or more general-purpose processors such as a microprocessor, a central processing unit (CPU), Micro Controller Unit (MCU), etc. Processor 1001 can be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1001 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 1001, can also be a low power multi-core processor socket such as an ultra low voltage processor, may act as a main processing unit and central hub for communication with the various components of the system. Such processor can be implemented as a system on chip (SoC).

Processor 1001 is configured to execute instructions for performing the operations and methods discussed herein. System 1000 further includes a graphics interface that communicates with graphics subsystem 1004, which may include a display controller and/or a display device. Processor 1001 can communicate with memory 1003, which in an embodiment can be implemented via multiple memory devices to provide for a given amount of system memory. In various embodiments the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector. Memory 1003 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 1003 may store information including sequences of executable program instructions that are executed by processor 1001, or any other device. System 1000 can further include IO devices such as devices 1005-1008, including wireless transceiver(s) 1005, input device(s) 1006, audio IO device(s) 1007, and other IO devices 1008.

Wireless transceiver 1005 can be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof. Input device(s) 1006 can include a mouse, a touch pad, a touch sensitive screen (which may be integrated with display device 1004), a pointer device such as a stylus, and/or a keyboard (e.g., physical keyboard or a virtual keyboard displayed as part of a touch sensitive screen). Other optional devices 1008 can include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 1008 can further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors can be coupled to interconnect 1022 via a sensor hub (not shown), while other devices such as a keyboard or thermal sensor may be controlled by an embedded controller (not shown), dependent upon the specific configuration or design of system 1000.

To provide for persistent storage of information such as data, applications, one or more operating systems and so forth, in one embodiment, a mass storage (not shown) may also couple to processor 1001. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 1001, e.g., via a serial peripheral interface (SPI). This flash device may provide for non-volatile storage of system software, including a basic input/output software (BIOS) as well as other firmware of the system.

Note that while system 1000 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Furthermore, various techniques described in U.S. patent application Ser. No. 16/262,880, titled, "Texture Based Pixel Count Determination" and U.S. patent application Ser. No. 16/262,881, titled, "Geometric Area Of Projection Of A Multidimensional Object In A Viewport Space," filed concurrently herewith, can be implemented in embodiments and/or aspects of the invention described herein; as a result the contents of those patent applications are hereby incorporated by reference to the extent such content is consistent herewith.

Thus, methods, apparatuses, and computer readable medium to determine viewability metrics of a multidimensional object in a multidimensional digital environment are described herein. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A method comprising:
rendering, by a computing system, a viewport of a multidimensional digital environment displayed on a graphical user interface, wherein the viewport includes an object of interest, and wherein the object of interest is predetermined and includes a multidimensional digital object or a portion thereof, and wherein only the object of interest is rendered with a first set of colors;
determining a first number of pixels rendered with the first set of colors;
determining a second number of pixels in the viewport, the second number of pixels representing the total number of pixels of the viewport;
calculating a first ratio by dividing the first number of pixels by the second number of pixels;
determining a geometrical area of projection (GAP) of the object of interest on the viewport wherein the GAP includes a total area projected by the object of interest in a normalized viewport space; and
calculating a second ratio by dividing the first ratio by the GAP;
wherein the method determines a metric of viewability of the object of interest.

2. The method of claim 1, wherein the GAP of the object of interest on the viewport is determined by:
projecting vertices of the object of interest from world coordinates to the normalized viewport space; and
calculating the total area projected by the vertices of the object of interest in the normalized viewport space.

3. The method of claim 2, wherein the total area projected by the vertices of the first set of colors includes:
calculating an area of each face projected by the vertices of the first set of colors in the normalized viewport space visible; and
performing a summation of the area of each face projected by the vertices of the first set of colors in the normalized viewport space.

4. The method of claim 1 wherein another object, within the viewport, is rendered with a second set of colors, the another object not being the object of interest.

5. The method of claim 1, wherein the object of interest includes a multidimensional bounding box enclosing the multidimensional digital object.

6. The method of claim 1, wherein the multidimensional digital environment is at least a three-dimensional environment, and wherein the multidimensional digital object is at least a three-dimensional digital object.

7. A non-transitory computer readable medium comprising instructions which when executed by a processing system implements a method, comprising:
rendering a viewport of a multidimensional digital environment displayed on a graphical user interface, wherein the viewport includes an object of interest, and wherein the object of interest is predetermined and includes a multidimensional digital object or a portion thereof, and wherein only the object of interest is rendered with a first set of colors;
determining a first number of pixels rendered with the first set of colors;
determining a second number of pixels in the viewport, the second number of pixels representing the total number of pixels of the viewport;
calculating a first ratio by dividing the first number of pixels by the second number of pixels;
determining a geometrical area of projection (GAP) of the object of interest on the viewport wherein the GAP includes a total area projected by the object of interest in a normalized viewport space; and
calculating a second ratio by dividing the first ratio by the GAP;
wherein the method determines a metric of viewability of the object of interest.

8. The non-transitory computer readable medium of claim 7, wherein the GAP of the object of interest on the viewport is determined by: projecting vertices of the object of interest from world coordinates to the normalized viewport space; and calculating the total area projected by the vertices of the object of interest in the normalized viewport space.

9. The non-transitory computer readable medium of claim 8, wherein the total area projected by the vertices of the first set of colors includes:
calculating an area of each face projected by the vertices of the first set of colors in the normalized viewport space; and
performing a summation of the area of each face projected by the vertices of the first set of colors in the normalized viewport space.

10. The non-transitory computer readable medium of claim 7, wherein another object, within the viewport, is rendered with a second set of colors, the another object not being the object of interest.

11. The non-transitory computer readable medium of claim 7, wherein the object of interest includes a multidimensional bounding box enclosing the multidimensional digital object.

12. The non-transitory computer readable medium of claim 7, wherein the multidimensional digital environment is at least a three-dimensional environment, and wherein the multidimensional digital object is at least a three-dimensional digital object.

13. A system, comprising:
a memory module;
a processing system comprising at least one hardware core coupled to the memory module configured to:
render a viewport of a multidimensional digital environment displayed on a graphical user interface, wherein the viewport includes an object of interest, and wherein the object of interest is predetermined and includes a multidimensional digital object or a portion thereof, and wherein only the object of interest is rendered with a first set of colors;
determine a first number of pixels rendered with the first set of colors;
determine a second number of pixels in the viewport, the second number of pixels representing the total number of pixels of the viewport;
calculate a first ratio by dividing the first number of pixels by the second number of pixels;
determine a geometrical area of projection (GAP) of the object of interest on the viewport wherein the GAP includes a total area projected by the object of interest in a normalized viewport space; and
calculate a second ratio by dividing the first ratio by the GAP;
wherein the method determines a metric of viewability of the object of interest.

14. The system of claim 13, wherein to determine the GAP of the object of interest on the viewport, the processing system is further configured to: project vertices of the object of interest from world coordinates to the normalized viewport space; and calculate the total area projected by the vertices of the object of interest in the normalized viewport space.

15. The system of claim 14, wherein to determine the total area projected by the vertices of the first set of colors the processing system is further configured to:
calculate an area of each face projected by the vertices of the first set of colors in the normalized viewport space; and
perform a summation of the area of each face projected by the vertices of the first set of colors in the normalized viewport space.

16. The system of claim 13, wherein another object, within the viewport, is rendered with a second set of colors, the another object not being the object of interest.

17. The system of claim 13, wherein the object of interest includes a multidimensional bounding box enclosing the multidimensional digital object.

18. The system of claim 13, wherein the multidimensional digital environment is at least a three-dimensional environment, and wherein the multidimensional digital object is at least a three-dimensional digital object.

* * * * *